United States Patent Office
3,397,270
Patented Aug. 13, 1968

3,397,270

METHOD FOR CONTROLLING AND ERADICATING INSECTS WITH PHOSPHOROAMIDATE STERILANTS

Philip C. Hamm, Glendale, Mo., assignor to Monsanto Company, St. Louis, Mo., a corporation of Delaware No Drawing. Filed Jan. 25, 1967, Ser. No. 611,546
11 Claims. (Cl. 424—220)

ABSTRACT OF THE DISCLOSURE

Compounds of the following formula are insect chemosterilants:

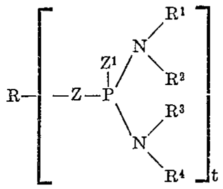

wherein R is selected from the group consisting of (1) an organic radical of not more than 12 carbon atoms and 3 halogen atoms (Cl, Br, I and F) selected from the group consisting of alkyl, haloalkyl, alkenyl, and haloalkenyl, and (2)

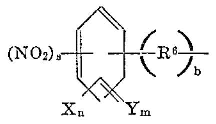

wherein X is halogen (Cl, Br, I and F), Y is selected from the group consisting of alkyl and haloalkyl of not more than 18 carbon atoms and 3 halogen atoms (Cl, Br, I and F) and alkoxy of not more than 4 carbon atoms, $R^6$ is alkylene of not more than 4 carbon atoms, $s$ is an integer from 0 to 2 inclusive, $m$ is an integer from 0 to 3 inclusive, $n$ is an integer from 0 to 5 inclusive and $b$ is an integer from 0 to 1;

$R^1$, $R^2$, $R^3$ and $R^4$ are each selected from the group consisting of hydrogen, $CH_3$ and $CH_2R^5X^1_a$ wherein $R^5$ is hydrocarbyl of not more than 12 carbon atoms selected from the group consisting of alkyl, alkenyl and alkynyl, $X^1$ is halogen (Cl, Br, F and I) and $a$ is an integer from 0 to 3 inclusive; Z and $Z^1$ are selected from the group consisting of oxygen and sulfur, and $t$ is an integer from 1 to 2, provided that $t$ is always 1 when R is selected from the group consisting of (1).

This invention relates to methods for the control or eradication of insect populations.

The term "insect" is used herein in its broad common usage to include spiders, mites, ticks and like pests which are not in the strict biological sense classed as insects. Thus, the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged usually winged forms, such as beetles, bugs, bees, flies, and so forth, but also to other allied classes of arthropods whose members are wingless and usually have more than six legs, as spiders, mites, ticks, centipedes and wood lice.

In accordance with this invention it has been found that insects can be controlled or eradicated by a method which comprises exposing the insect to a sterilizing amount of a compound of the formula

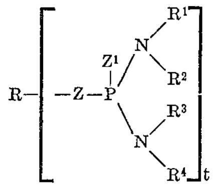

wherein R is selected from the group consisting of (1) an organic radical of not more than 12 carbon atoms and 3 halogen atoms (Cl, Br, I and F) selected from the group consisting of alkyl, haloalkyl, alkenyl, and haloalkenyl, and (2)

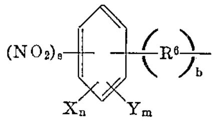

wherein X is halogen (Cl, Br, I and F), Y is selected from the group consisting of alkyl and haloalkyl of not more than 18 carbon atoms and 3 halogen atoms (Cl, Br, I and F) and alkoxy of not more than 4 carbon atoms, $R^6$ is alkylene of not more than 4 carbon atoms, $s$ is an integer from 0 to 2 inclusive, $m$ is an integer from 0 to 3 inclusive, $n$ is an integer from 0 to 5 inclusive and $b$ is an integer from 0 to 1;

$R^1$, $R^2$, $R^3$ and $R^4$ are each selected from the group consisting of hydrogen, $CH_3$ and $CH_2R^5X^1_a$ wherein $R^5$ is hydrocarbyl of not more than 12 carbon atoms selected from the group consisting of alkyl, alkenyl and alkynyl, $X^1$ is halogen (Cl, Br, F and I) and $a$ is an integer from 0 to 3 inclusive; Z and $Z^1$ are selected from the group consisting of oxygen and sulfur, and $t$ is an integer from 1 to 2, provided that $t$ is always 1 when R is selected from the group consisting of (1).

In the above formula Y can be alkyl such as methyl, ethyl, n-propyl, isopropyl, n-butyl, sec-butyl, isobutyl, tert-butyl, amyl, hexyl, heptyl, octyl, nonyl, decyl, undecyl, dodecyl, octadecyl and the various homologues and isomers of alkyl of not more than 18 carbon atoms, haloalkyl such as chloromethyl, iodomethyl, bromomethyl, fluoromethyl, trichloromethyl, chloroethyl, iodoethyl, trifluoromethyl, bromoethyl, difluoromethyl, dichloromethyl, diiodoethyl, dibromoethyl, fluoroethyl, dichloroethyl, chloro-n-propyl, bromo-n-propyl, iodoisopropyl, bromo-n-butyl, bromo-tert-butyl, 1,3,3-trichlorobutyl, 1,3,3-trifluorobutyl, 1,3,3-tribromobutyl, 1,3,3-trichlorooctyl and the halogenated straight and branched chain alkyl of not more than 18 carbon atoms, and alkoxy such as methoxy, ethoxy, n-propoxy, isopropoxy, n-butoxy, isobutoxy, sec-butoxy and tert-butoxy. When $R^1$, $R^2$, $R^3$ and $R^4$ are represented by $CH_2R^5X^1_a$, the $R^5X^1_a$ can be, for example, alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologues and isomers of alkyl having from 1 to 12 carbon atoms, alkenyl such as vinyl, allyl, n-butenyl-1, n-butenyl-2, n-pentenyl-2, 2,3-dimethyl-1-pentenyl, n-hexenyl-2, 2,3-dimethylbutenyl-2, n-heptenyl, n-decenyl, n-dodecenyl and the various homologues and isomers of alkenyl having 2 to 12 carbon atoms, alkynyl such as propargyl and the various homologues and isomers of alkynyl having from 3 to 12 carbon atoms, haloalkyl such as chloromethyl, iodomethyl, bromomethyl, fluoromethyl, trichloromethyl, trifluoromethyl, tribromomethyl, chloroethyl, iodoethyl, bromoethyl, fluoroethyl, dichloromethyl, diodomethyl, dibromomethyl, difluoromethyl, dichloroethyl, difluoroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3- dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-di(chloromethyl)heptyl, chlorooctyl, bromooctyl, iodooctyl, 2,4-di(chloromethyl)hexyl, 2,4-dichlorooctyl, 2,4,4-tri(chloromethyl)pentyl, 1,3,5-tribromooctyl and the halogenated straight and branched chain nonyl, decyl, undecyl and dodecyl; haloalkenyl such as chlorovinyl, bromovinyl, chloroallyl, bromoallyl, 3-chloro-n-butenyl-1, 3-chloro-n-pentenyl-1, 4-chloro-n-hexenyl - 2, 3,4 - di(chloromethyl)pentenyl-1, 3-fluoro-n-heptenyl-1, 1,3,3-trichloro-n-heptenyl-5, 1,3,5-trichloro-n-octenyl-6, 2,3,3-tri(chloromethyl)pentenyl-4 and the various homologues and isomers of haloalkenyl having 2 to 12 carbon atoms, and haloalkynyl such as chloropropargyl, bromopropargyl, iodopropargyl and the various homologues and isomers of haloalkynyl having 3 to 12 carbon atoms.

The alkyl, haloalkyl, alkenyl and haloalkenyl of R in the above formula can be those listed above for $R^3X^1_a$, and $R^6$ can be, for example, methylene, ethylene, butylene and the like.

For the sake of brevity, the amidates of the above formula which are useful in the methods of this invention are referred to hereinafter as "chemosterilants."

In carrying out the methods of this invention, the chemosterilants, admixtures thereof or compositions containing them are applied to the insects or to their environment in an amount sufficient to exert a sterilizing action. Chemosterilant compositions generally contain from 0.001% to about 99.99% by weight of chemosterilant. The lower concentrations of chemosterilant are particularly effective when the compositions are liquid, but it is preferred to use higher concentrations of chemosterilant when the compositions are semi-solid or solid. Compositions comprising from about 0.001% to about 5% by weight of chemosterilant are preferred with those comprising from about 0.001% to about 2% by weight being particularly advantageous. A wide variety of insects, for example, house flies (*Musca domestica*), screw-worm flies (*Cochliomyia hominivorax*), Mexican fruit flies (*Anastrepha ludens*), oriental fruit fly, vinegar flies, eye gnats, stable flies, mosquitoes, boll weevils, pomace flies (*Drosophila melanogaster*), Mediterranean fruit flies, cotton bollworm, codling moth, plum curculio, and the like, can be controlled or eradicated in accordance with the methods of this invention.

The chemosterilants which can be used in the methods of this invention include the following:

O-[(m-trifluoromethyl)phenyl]-N,N′-di-n-butyl-N,N′-dimethylphosphorodiamidate
O-(m-chlorophenyl)-N,N′-di-n-butyl-N,N′-dimethylphosphorodiamidate
O-phenyl-N,N′-diisobutyl-N,N′-dimethylphosphorodiamidate
O-phenyl-N-methyl-N-butyl-N′-ethyl-N′-propylphosphorodiamidate
O-phenyl-N,N′-dimethyl-N,N′-dipropylphosphorodiamidate
O-(3,4-dichlorophenyl)-N,N′-di-n-butyl-N,N′-dimethylphosphorodiamidate O-phenyl-N,N′-diethyl-N,N′-di-n-propylphosphorodiamidate
O-phenyl-N,N′-dimethyl-N,N′-di-n-octylphosphorodiamidate
O-phenyl-N,N,N′,N′-tetramethylphosphorodiamidate
O,O′-m-phenylenebis-(N,N-dimethylphosphorodiamidate)
O-phenyl-N,N′-dimethyl-N,N′-di-n-heptylphosphorodiamidate
O-phenyl-N,N′-dimethyl-N,N′dipropenylphosphorodiamidate
O-ethyl-N,N′-dimethyl-N,N′-dipropenylphosphorodiamidate
O-phenyl-N,N′-dimethyl-N,N′-di-2-heptenylphosphorodiamidate
O-propyl-N,N′-dimethyl-N,N′-di-2-heptenylphosphorodiamidate
O-phenyl-N,N′-dibutyl-N,N′-dipropargylphosphorodiamidate
O-butenyl-N,N′-dibutyl-N,N′-dipropargylphosphorodiamidate
O-phenyl-N,N′-didodecyl-N,N′-di-n-propylphosphorodiamidate
O-4-chlorobutyl-N,N′-didodecyl-N,N′-di-n-propylphosphorodiamidate
O-phenyl-N,N′-di-2-octenyl-N,N′-dimethylphosphorodiamidate
O-4-chlorobutenyl-N,N′-di-2-octenyl-N,N′-dimethylphosphorodiamidate
O-phenyl-N,N′-dibutenyl-2-N,N′-dimethylphosphorodiamidate
O-phenyl-N,N′-di(2-chlorobutyl)-N,N′-di(2-chloroethyl)phosphorodiamidate
O-phenyl-N,N′-di(2-fluoroethyl)-N,N′-dimethylphosphorodiamidate
O-phenyl-N,N′-di(2-bromoethyl)-N,N′-di(2-chlorobutyl)phosphorodiamidate
O-ethyl-N,N′-di(2-bromoethyl)-N,N′-di(2-chlorobutyl)phosphorodiamidate
O-phenyl-N,N′-di(2-chlorobutenyl-3)-N,N′-dimethylphosphorodiamidate
O-phenyl-N,N′-di(3-chlorooctyl)-N,N′-dimethylphosphorodiamidate
O-phenyl-N,N′-dimethyl-N,N′-di(2-bromoethyl)-phosphorodiamidate
O-phenyl-N,N′-di(3-chloroheptenyl-2)-N,N′-dimethylphosphorodiamidate
O-ethyl-N,N′-di(3-chloroheptenyl-2)-N,N′-dimethylphosphorodiamidate
O-(2,4,6-trichlorophenyl)-N,N′-dimethyl-N,N′-di-n-butylphosphorodiamidate
O-(2,4-difluorophenyl)-N,N′-dimethyl-N,N′-di-n-butylphosphorodiamidate
O-(4-iodophenyl)-N,N′-dimethyl-N,N′-di-n-butylphosphorodiamidate
O-(3,5-dibromophenyl)-N,N′-dimethyl-N,N′-di-n-butylphosphorodiamidate
O-(4-methylphenyl)-N,N′-dimethyl-N,N′-di-n-butylphosphorodiamidate
O-(2,4-dimethylphenyl)-N,N′-dimethyl-N,N′-di-n-butylphosphorodiamidate
O-(2-tert-butylphenyl)-N,N′-diisopropyl-N,N′-dimethylphosphorodiamidate
O-(2,6-di-tert-butylphenyl)-N,N′-diisopropyl-N,N′-dimethylphosphorodiamidate
O-(2,4,6-trimethylphenyl)-N,N′-diisopropyl-N,N′-dimethylphosphorodiamidate
O-(4-methoxyphenyl)-N,N′-diisopropyl-N,N′-dimethylphosphorodiamidate
O-(2,4-dibutoxyphenyl)-N,N′-diisopropyl-N,N′-dimethylphosphorodiamidate
O-[2,4-di(trifluoromethyl)phenyl]-N,N′-diisopropyl-N,N′-dimethylphosphorodiamidate
O-(4-chloromethylphenyl)-N,N′-diisopropyl-N,N′-dimethylphosphorodiamidate O-(2-chloro-4-methylphenyl)-N,N'-diisopropyl-N,N'-dimethylphosphorodiamidate
O-(2,4-dichloro-6-tert-butylphenyl)-N,N'-diisopropyl-N,N'-dimethylphosphorodiamidate
O-(2,6-dichloro-4-methoxyphenyl)-N,N'-diisopropyl-N,N'-dimethylphosphorodiamidate
O-(4-nitrophenyl)-N,N,N',N'-tetramethylphosphorodiamidate
O-(2-octylphenyl)-N,N'-dimethyl-N,N'-di-n-butylphosphorodiamidate
O-(4-tetradecylphenyl)-N,N'-dimethyl-N,N'-di-n-butylphosphorodiamidate
O-(2,4-dihexadecylphenyl)-N,N'-dimethyl-N,N'-di-n-butylphosphorodiamidate
O-(4-octadecylphenyl)-N,N'-dimethyl-N,N'-di-n-butylphosphorodiamidate
O-(2,4-didodecylphenyl)-N,N'-dimethyl-N,N'-di-n-butylphosphorodiamidate
O-phenyl-N,N,N',N'-tetramethylphosphorothionodiamidate
O-[(m-trifluoromethyl)phenyl]-N,N'-di-n-butyl-N,N'-dimethylphosphorothionodiamidate
O-(3,4-dichlorophenyl)-N,N'-di-n-butyl-N,N'-dimethylphosphorothionodiamidate
O-(4-chlorophenyl)-N,N'-di-n-butyl-N,N'-dimethylphosphorothionodiamidate
O-(4-methylphenyl)-N,N'-di-n-butyl-N,N'-dimethylphosphorothionodiamidate
O-(2-nitrophenyl)-N,N'-di-n-butyl-N,N'-dimethylphosphorothionodiamidate
O,O'-p-phenylenebis-(N,N-dimethylphosphorodiamidate)
O,O'-p-phenylenebis-(N,N-dimethylphosphorothionodiamidate)

The following examples will illustrate the invention. Parts and percent are by weight unless otherwise indicated.

Example 1.—(House fly)

Adult flies are fed granulated sugar and regular fly food containing 1.0% by weight of O-benzyl-N,N,N',N'-tetramethylphosphorodiamidate. The regular fly food consists of 6 parts sugar, 6 parts powdered non-fat dry milk and one part powdered egg yolk. Chemosterilant food compositions are prepared by separately adding 6 ml. of a solution or suspension of O-benzyl-N,N,N',N'-tetramethylphosphorodiamidate in a volatile solvent to 10 gms. each of the regular fly food and sugar. The sugar and regular fly food chemosterilant food compositions are allowed to dry, repulverized and placed in emergence cages which contain 100 newly emerged adult flies. Cages containing untreated regular fly food and sugar are used as controls. All cages are supplied with ample water. After three days the flies are examined and the mortality rate, if any, is noted. At the same time, a dish containing untreated regular fly food consisting of 6 parts sugar, 6 parts powdered non-fat dry milk and one part powdered egg yolk is added to the cages of the flies which are on the sugar diet. When the flies are 6 to 7 days old, one-half inch of moist Chemical Specialties Manufacturers Association medium in a soufflé cup is placed in each cage for oviposition. A few hours later each soufflé cup is removed, filled with water and stirred to separate the egg masses into individual eggs. The eggs from all egg masses are mixed thoroughly and a random sample of 100 eggs from each cage is placed on a small piece of wet black cloth. The black cloth is then placed on moist larval medium in a rearing container. If no eggs are laid, oviposition medium is offered again at intervals of one or two days until it has been offered five times or the flies have oviposited. Three days after oviposition the eggs are examined and the percentage hatched is determined. The larvae that hatch crawl from the cloth into the rearing medium. About 7 days after oviposition the number of pupae are counted to determine the number of larvae that reach the pupal stage of development. Results and further details are given below in Table 1.

TABLE 1.—CHEMOSTERILANT ACTIVITY OF O-BENZYL N,N,N',N'-TETRAMETHYLPHOSPHORODIAMIDATE AGAINST THE HOUSE FLY AT 1.0% CONCENTRATION.

| Type of Food | Treated Diet | | | Untreated Diet | |
|---|---|---|---|---|---|
| | Mortality [1] | Egg Hatch [1] | Pupae [2] | Egg Hatch [1] | Pupae [2] |
| Fly Food | 0 | 95 | 68 | 98 | 93 |
| Sugar | 0 | 89 | 15 | 96 | 91 |

[1] Expressed as percent. [2] Actual number.

Example 2.—(Screw-worm fly)

Tests are made with adult screw-worm flies less than 24 hours old. The flies are fed a freshly prepared quantity of sugar syrup containing the chemosterilant for 5 days. After the fifth day, ample quantities of meat, untreated honey and water are provided so that the flies can feed freely. On the eighth day following oral application of the chemosterilant, the females are given the opportunity to lay eggs which are subsequently observed for hatching. The chemosterilants are rated on the basis of no oviposition or failure of eggs to hatch. No oviposition occurred with O-benzyl-N,N,N',N'-tetramethylphosphorodiamidate at a concentration of 0.05% and O-ethyl-N,N,N',N'-tetraethylphosphorodiamidate at a concentration of 0.5%.

In carrying out the methods of this invention, the chemosterilants can be used alone or in combination with an adjuvant in liquid, solid or gaseous form. Chemosterilant compositions are prepared by admixing the chemosterilant with an adjuvant including diluents, extenders, carriers and conditioning agents to provide compositions in the form of finely-divided particulate solids, semi-solids, aerosols, solutions and dispersions or emulsions. Thus the chemosterilant can be used with an adjuvant such as a finely-divided particulate solid, a liquid of organic origin, water, a wetting agent, dispersing agent, an emulsifying agent or any suitable combination of these.

Typical finely-divided solid carriers and extenders which can be used in chemosterilant compositions include, for example, the talcs, clays, pumice, silica, diatomaceous earth, quartz, fuller's earth, salt, sulfur, powdered cork, powdered wood, walnut flour, chalk, tobacco dust, volcanic ash, cottonseed hulls, wheat flour, soybean flour, tripoli, charcoals and the like. Typical liquid diluents include for example, kerosene, Stoddard solvent, hexane, benzene, toluene, water, acetone, ethylene dichloride, xylene, alcohols, Diesel oil, glycols and the like. Typical liquified gasses for aerosols include, for example, haloalkyls such as dichlorodifluoromethane, fluorotrichloromethane, and the like. Typical semi-solid extenders include, for example, soap, petroleum jelly, and the like.

The chemosterilants also can be employed in conjunction with attractants for the particular insect being controlled. For example, they can be applied to or admixed with attractants or baits such as sucrose, glucose, molasses, protein mixtures, powdered egg yolk, powdered milk, yellow corn grits, quincy granules, pumice granules, sex attractants, and the like.

Chemosterilant compositions, particularly liquids and wettable particles, usually contain as a conditioning agent one or more surface active agents in amounts sufficient to render a given composition readily dispersible in water or in oil. By the term "surface-active agent" it is understood that wetting-agents, dispersing agents, suspending agents and emulsifying agents are included therein.

The term "chemosterilant composition" as used herein includes not only compositions in a suitable form for application but also concentrated compositions which require dilution or extension with a suitable quantity of liquid or solid adjuvant prior to application.

Surface-active agents which can be used in the chemosterilant compositions are set out, for example, in Searly U.S. Patent 2,426,417, Todd U.S. 2,655,447, Jones U.S. Patent 2,412,510 and Lenher U.S. Patent 2,139,276.

A detailed list of such agents is also set forth by J. W. McCutcheon in "Soap and Chemical Specialities," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general, less than about 50 parts by weight of the surface active agent is present per 100 parts by weight of chemosterilant composition.

The preferred chemosterilant compositions are the wettable powders, dusts, aqueous suspensions or solutions, hydrocarbon solutions and emulsifiable oils.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols and polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions usually contain from about 5 to about 95 parts of active ingredient, from about 0.25 to about 25 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Dusts are dense finely divided particulate compositions which are intended for application in dry form. Dusts are characterized by their free-flowing and rapid settling properties so that they are not readily wind-borne to areas where they are of no value. Dusts contain primarily an active ingredient and a dense, free-flowing, finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust.

The wettable powders described above can also be used in the preparation of dusts. While such wettable powders can be used directly in dust form, it is more advantageous to dilute them by blending with the dense dust diluent. In this manner, dispersing agents, corrosion inhibitors and anti-foam agents may also be found as components of a dust.

Emulsifiable oils are usually solutions of active ingredient in water-immisible or partially water-immiscible solvents together with a surfactant. Suitable solvents include hydrocarbons and certain water-immiscible ethers, esters or ketones. Suitable surfactants are anionic, cationic and non-ionic such as alkyl aryl polyethoxy alcohols, polyethylene sorbitol or soribtan fatty acid esters, polyethylene glycol fatty esters, fatty alkylol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surfactant and about 4 to 94 parts solvent, all parts being by weight based on the total weight of emulsifiable oil.

The amidates useful in the methods of this invention can be prepared by the process disclosed in copending application, Ser. No. 479,319, filed Aug. 12, 1965, now abandoned.

Although the invention is described with respect to specific modifications, the details thereof are not to be construed as limitations except to the extent indicated in the following claims.

The embodiments of the invention in which an exclusive property or privilege is claimed are defined as follows:

1. A method for the control or eradication of insects which comprises the oral administration to said insects of a sterilizing amount of a compound of the formula

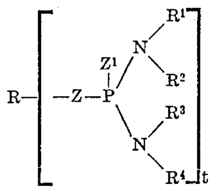

wherein R is selected from the group consisting of (1) an organic radical of not more than 12 carbon atoms and 3 halogen atoms selected from the group consisting of alkyl, haloalkyl, alkenyl, and haloalkenyl, and (2)

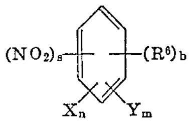

wherein X is halogen, Y is selected from the group consisting of alkyl and haloalkyl of not more than 18 carbon atoms and 3 halogen atoms and alkoxy of not more than 4 carbon atoms, $R^6$ is alkylene of not more than 4 carbon atoms, *s* is an integer from 0 to 2 inclusive, *n* is an integer from 0 to 3 inclusive, *m* is an integer from 0 to 5 inclusive and *b* is an integer from 0 to 1;

$R^1$, $R^2$, $R^3$ and $R^4$ are each selected from the group consisting of hydrogen, $CH_3$ and $CH_2R^5X^1_a$ wherein $R^5$ is hydrocarbyl of not more than 12 carbon atoms selected from the group consisting of alkyl, alkenyl and alkynyl, $X^1$ is halogen and *a* is an integer from 0 to 3 inclusive; Z and $Z^1$ are selected from the group consisting of oxygen and sulfur, and *t* is an integer from 1 to 2, provided that *t* is always 1 when R is selected from the group consisting of (1).

2. Method of claim 1 wherein R is selected from (2).

3. Method of claim 2 wherein Z and $Z^1$ are oxygen.

4. Method of claim 2 wherein Z is oxygen and $Z^1$ is sulfur.

5. Method of claim 2 wherein $R^1$, $R^2$ $R^3$ and $R^4$ are alkyl.

6. Method of claim 1 wherein R is selected from (1).

7. Method of claim 6 wherein Z and $Z^1$ are oxygen.

8. Method of claim 6 wherein $R^1$, $R^2$, $R^3$ and $R^4$ are alkyl.

9. Method of claim 1 wherein the compound is O-benzyl-N,N,N',N'-tetramethylphosphorodiamidate.

10. Method of claim 1 wherein the compond is O-ethyl-N,N,N',N'-tetraethylphosphorodiamidate.

11. The method of claim 1 wherein said insects are flies.

References Cited

UNITED STATES PATENTS

| | | | |
|---|---|---|---|
| 3,038,924 | 6/1962 | Schoot | 260—959 |
| 3,089,808 | 5/1963 | Meltzer | 260—959 |
| 3,157,568 | 11/1964 | Schoot | 260—959 |
| 3,309,429 | 3/1967 | Senkbeil | 260—959 |

ALBERT T. MEYERS, *Primary Examiner.*

S. FRIEDMAN, *Assistant Examiner.*